US012664698B2

(12) United States Patent
Honeycutt et al.

(10) Patent No.:  US 12,664,698 B2
(45) Date of Patent:   Jun. 23, 2026

(54) TECHNIQUES FOR GENERATING VISUALIZATION COMPONENTS FOR RESOURCE ALLOCATION

(71) Applicant: WELLS FARGO BANK, N.A., San Francisco, CA (US)

(72) Inventors: Margaret S. Honeycutt, Crockett, CA (US); Dennis E. Montenegro, Concord, CA (US); Sadie S. Salim, Mill Valley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 155 days.

(21) Appl. No.: 18/495,500

(22) Filed: Oct. 26, 2023

(65) Prior Publication Data

US 2025/0139854 A1     May 1, 2025

(51) Int. Cl.
*G06T 11/26* (2026.01)

(52) U.S. Cl.
CPC .......... *G06T 11/26* (2026.01); *G06T 2200/24* (2013.01)

(58) Field of Classification Search
None
See application file for complete search history.

(56) References Cited

U.S. PATENT DOCUMENTS

| | | | |
|---|---|---|---|
| 5,852,811 A | 12/1998 | Atkins | |
| 7,555,451 B2 | 6/2009 | Rugge et al. | |
| 7,895,102 B1 | 2/2011 | Wilks et al. | |
| 10,776,876 B1 * | 9/2020 | Ketharaju | ............ G06Q 20/351 |

(Continued)

FOREIGN PATENT DOCUMENTS

| | | |
|---|---|---|
| KR | 101070602 B1 | 10/2011 |
| KR | 102205456 B1 | 1/2021 |

OTHER PUBLICATIONS

CreativeAdvisor admin, "What Shapes Mean in Financial Logo Design", Available online at: https://creativeadviser.co.uk/financial-logos/shapes-meaning-design/, Oct. 2, 2018, 6 pages.

(Continued)

*Primary Examiner* — Jeffrey J Chow
(74) *Attorney, Agent, or Firm* — Kilpatrick Townsend & Stockton LLP

(57)            ABSTRACT

A visualization generation computing system generates a visualization data object based on a relationship among multiple portions of resource data, which describes a resource that can be allocated. The visualization data object at least one visualization component that indicates the relationship among the portions of resource data. A user device provides the visualization component via a user interface. The visualization generation computing system receives, from the user device, modification input data that describes an adjusted presentation of the visualization component. Based on the adjusted presentation, the visualization generation computing system determines a modified relationship among the portions of resource data. The visualization generation computing system modifies the visualization data object to include a modified visualization component that describes the modified relationship. In some cases, the visualization generation computing system modifies the portions of resource data based on the modified relationship described by the adjusted presentation.

20 Claims, 7 Drawing Sheets

User Device 580

(56)     References Cited

U.S. PATENT DOCUMENTS

| | | |
|---|---|---|
| 2002/0143680 A1 | 10/2002 | Walters et al. |
| 2004/0059654 A1* | 3/2004 | Schroder ................ G06Q 40/00 |
| | | 705/35 |
| 2006/0059070 A1 | 3/2006 | Petruck |
| 2007/0061250 A1* | 3/2007 | Kuo ....................... G06Q 40/02 |
| | | 705/39 |
| 2008/0201196 A1 | 8/2008 | Rowland |
| 2011/0066474 A1 | 3/2011 | Overman, et al. |
| 2014/0108298 A1 | 4/2014 | Moran et al. |
| 2014/0379557 A1* | 12/2014 | Brown ................... G06Q 40/02 |
| | | 705/39 |
| 2016/0239918 A1 | 8/2016 | Lambur et al. |
| 2016/0247231 A1 | 8/2016 | Connolly et al. |
| 2016/0253757 A1 | 9/2016 | Connolly et al. |
| 2019/0197614 A1 | 6/2019 | Sion et al. |
| 2020/0272959 A1* | 8/2020 | Mattsson ............... G06Q 20/22 |
| 2021/0097604 A1* | 4/2021 | Haffey .................... G06F 3/017 |
| 2022/0122092 A1* | 4/2022 | Ribeiro ............. G06Q 30/0185 |
| 2022/0366332 A1 | 11/2022 | Duessel |
| 2023/0289052 A1* | 9/2023 | Lee ....................... G06F 3/0482 |
| 2025/0135344 A1* | 5/2025 | Yuan .................... A63F 13/533 |

OTHER PUBLICATIONS

PPCexpo, "The Best Graph to Show Profit and Loss in Your Business", Available online at: https://ppcexpo.com/blog/best-graph-to-show-profit-and-loss, Believed to be published at least as early as Nov. 22, 2021, 18 pages.
Informoney Financial Planning, "The advantage of Visual Financial Planning", Available online at: https://www.informoney.com/home, Believed to be published at least as early as May 19, 2016, 5 pages.

* cited by examiner

Figure 1
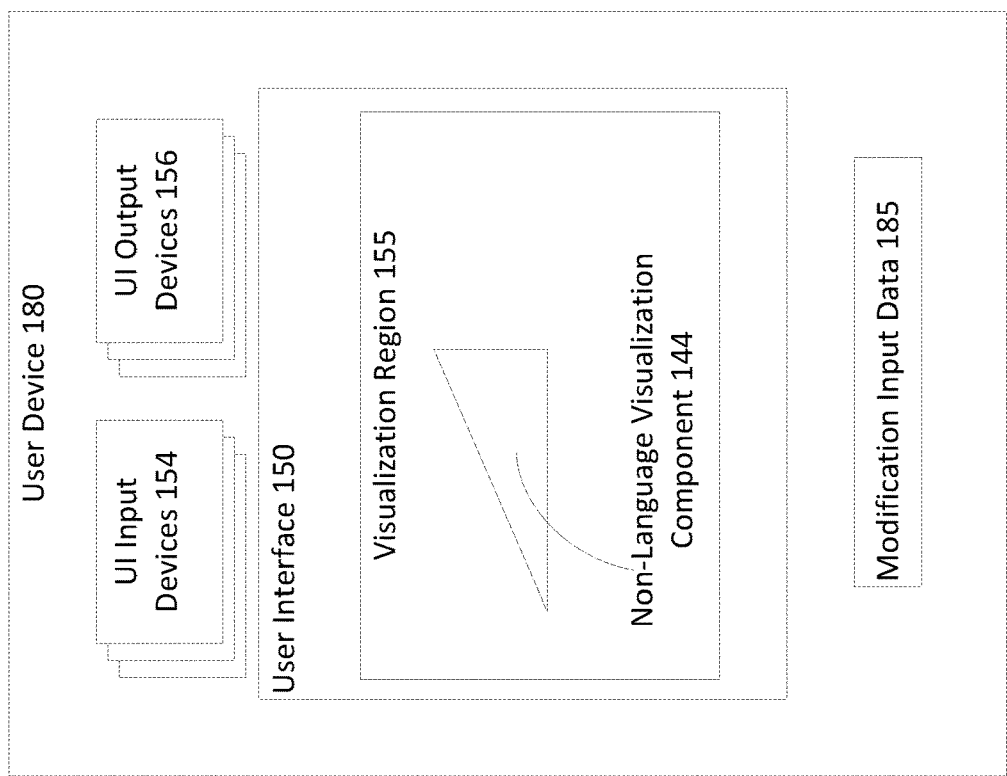
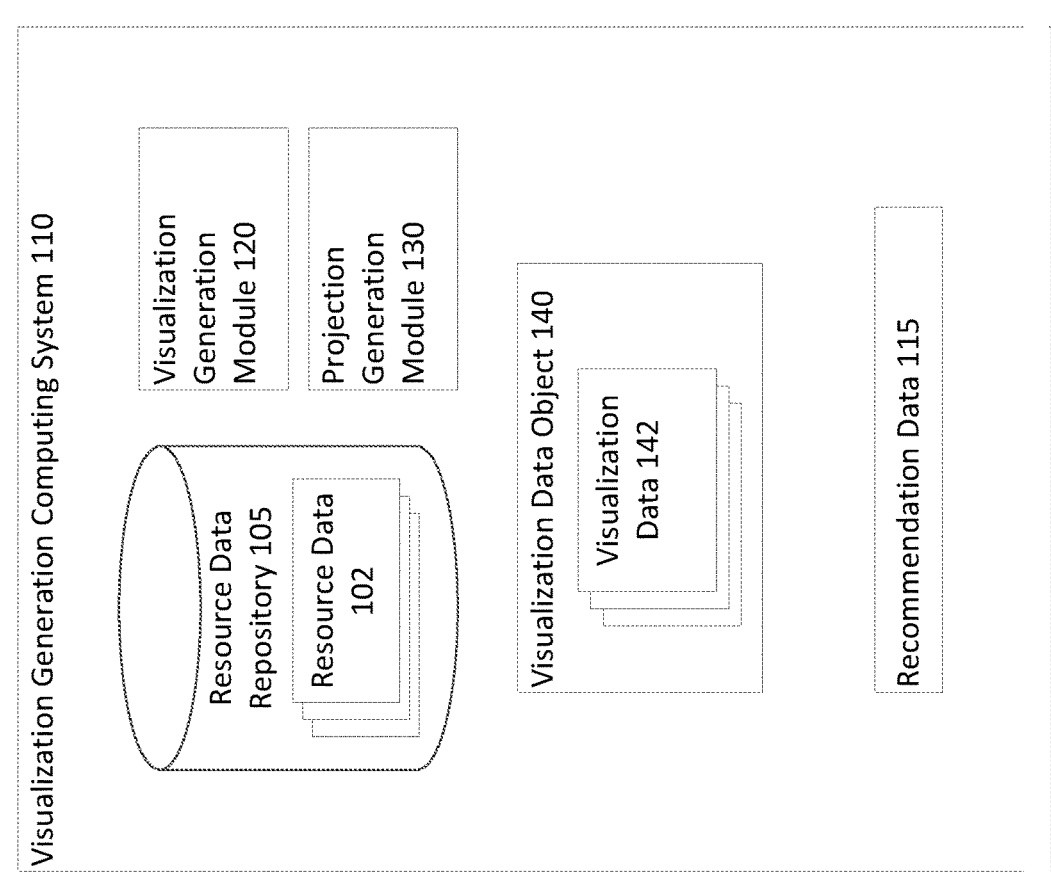

Figure 2

Computing Environment 200

Visualization Generation Computing System 210

Resource Data 202

Resource Data 202a

Resource Data 202b

Resource Data 202c

Data Repositories 205

Resource Data Repository 205a

User Behavior Data Repository 205b

Environmental Data Repository 205c

Visualization Data Object 240

Visualization Data 242

Visualization Generation Module 220

Resource Modification Data 225

Projection Generation Module 230

Relationship Data 235

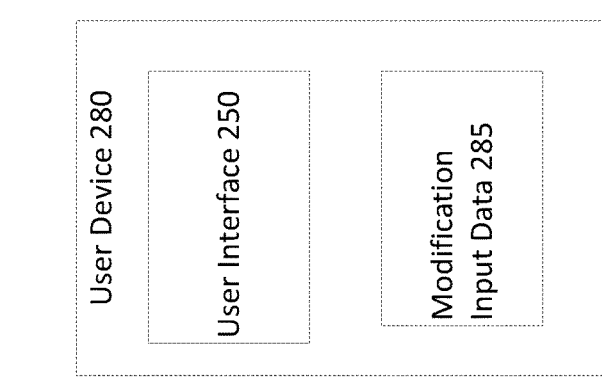

User Device 280

User Interface 250

Modification Input Data 285

300

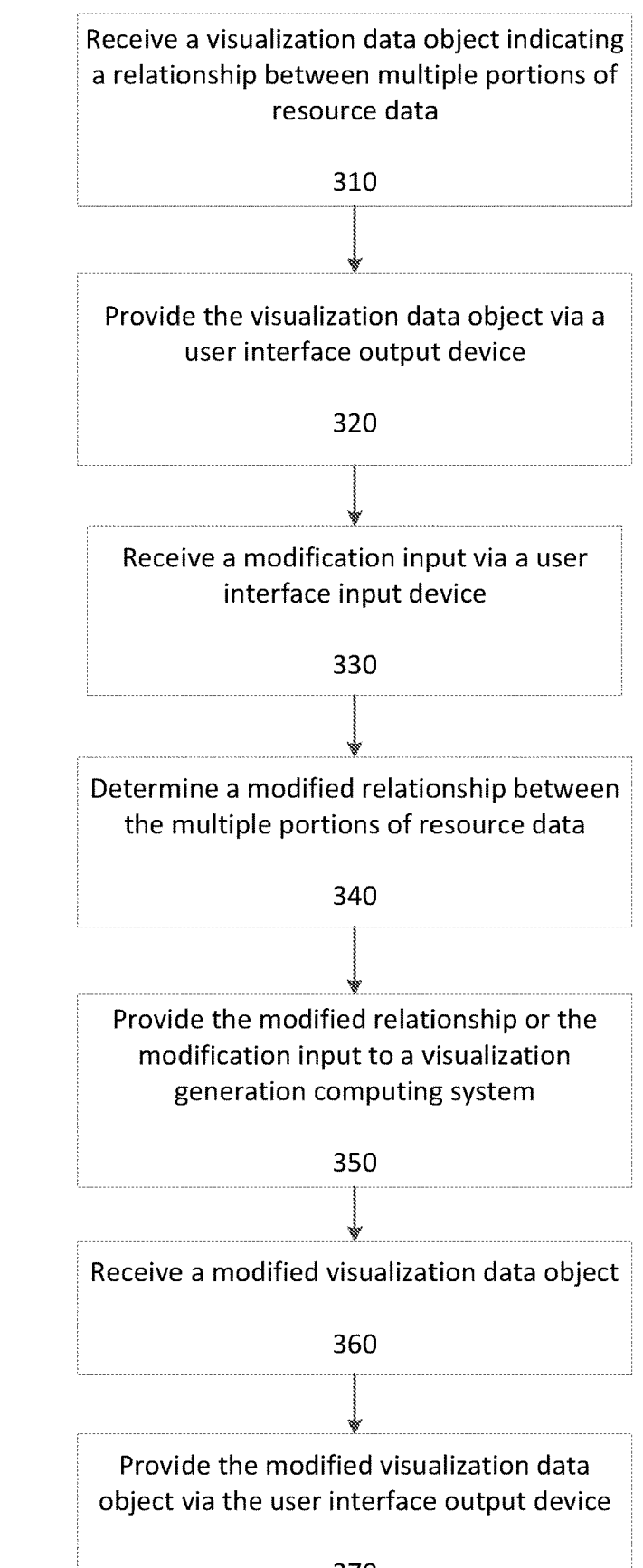

Receive a visualization data object indicating a relationship between multiple portions of resource data

310

Provide the visualization data object via a user interface output device

320

Receive a modification input via a user interface input device

330

Determine a modified relationship between the multiple portions of resource data

340

Provide the modified relationship or the modification input to a visualization generation computing system

350

Receive a modified visualization data object

360

Provide the modified visualization data object via the user interface output device

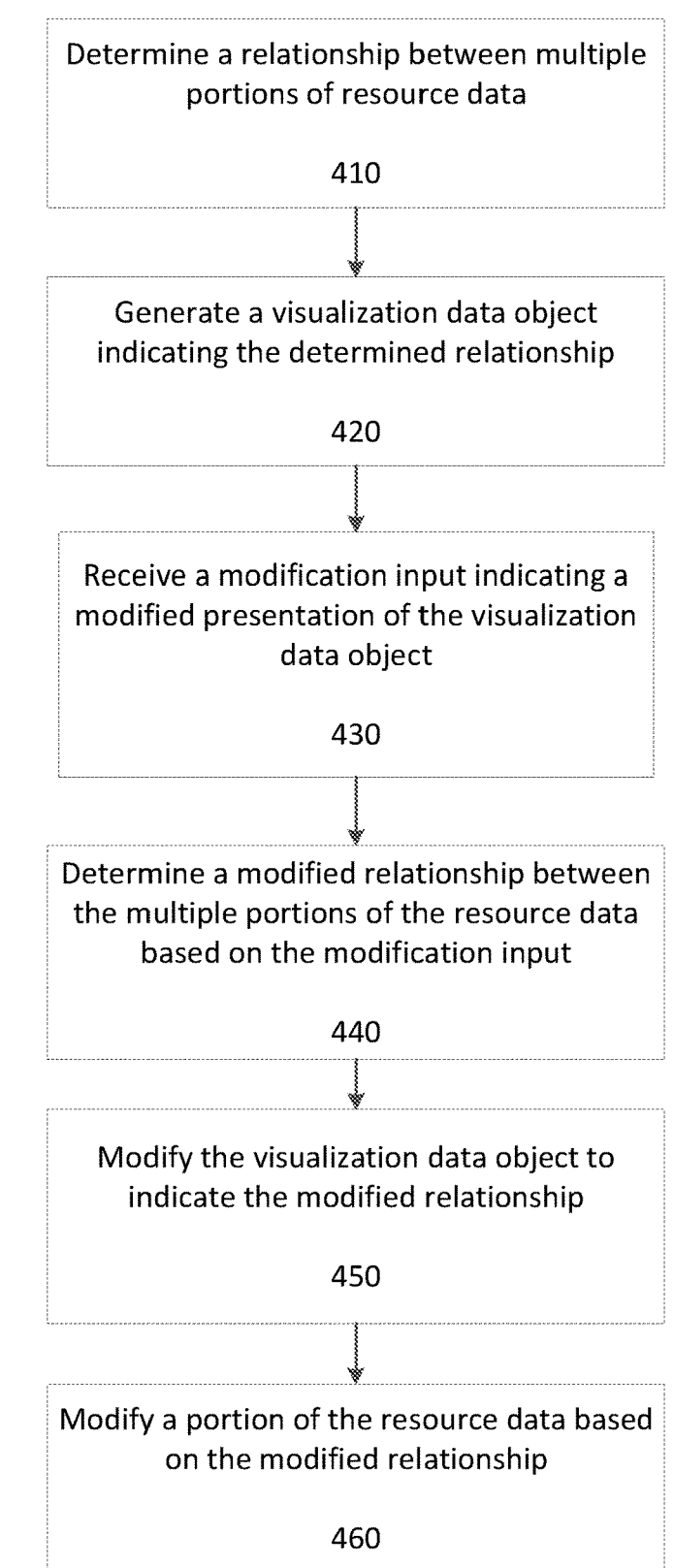

Determine a relationship between multiple portions of resource data

410

Generate a visualization data object indicating the determined relationship

420

Receive a modification input indicating a modified presentation of the visualization data object

430

Determine a modified relationship between the multiple portions of the resource data based on the modification input

440

Modify the visualization data object to indicate the modified relationship

450

Modify a portion of the resource data based on the modified relationship

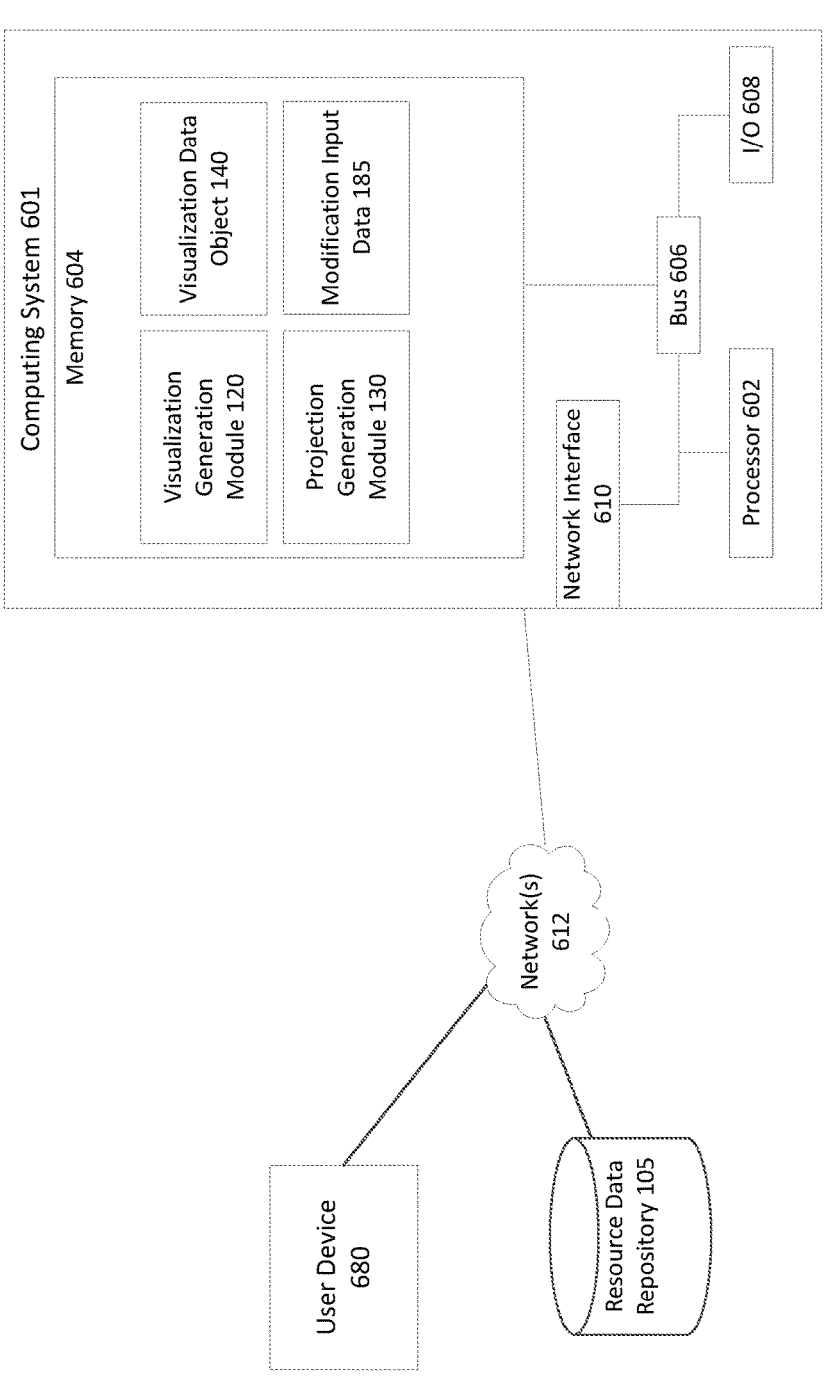
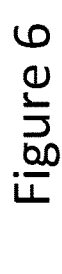
Figure 6

TECHNIQUES FOR GENERATING VISUALIZATION COMPONENTS FOR RESOURCE ALLOCATION

TECHNICAL FIELD

This disclosure relates generally to the field of user interfaces, and more specifically relates to user interfaces for responsive data presentation.

BACKGROUND

Users often wish to use computer-implemented tools to assist with resource allocation. For example, a person who desires to achieve a scheduling goal, such as completing a multi-stage project, may seek a computer-implemented tool to assist with planning and setting interim goals (e.g., milestones) for overlapping project stages or potential time conflicts. In addition, a person who desires to achieve a financial goal, such as saving for college or purchasing a home, may seek a computer-implemented tool to assist with planning and setting interim goals for savings or investment plans. However, contemporary computer-implemented tools for resource allocation can be confusing or difficult to understand for some users. For example, a contemporary tool for setting financial goals may include a user interface that presents graphs or charts of numbers that are difficult to read, preventing a user from quickly understanding a relationship between resources and goals. In addition, the example user interface for the contemporary tool may lack a simple interface for modifying goals or plans, relying instead on user interface regions for text input or numerical calculations. In some cases, a non-intuitive user interface for a contemporary resource allocation tool can prevent some users from accurately understanding data that is presented by the contemporary tool, potentially leading to mistakes or inefficient allocation of a person's resources (e.g., financial resources, time resources).

It is desirable to develop data visualization techniques that can assist a user to rapidly and accurately understand resource allocation. In addition, it is desirable for technical tools to provide a user interface that can present resource data and receive inputs modifying the resource data in an intuitive and accurate visualization, which can assist users to efficiently allocate their resources and progress towards goals of the users.

SUMMARY

According to certain embodiments, a user device receives a visualization data object that is generated by a visualization generation computing system. The visualization data object indicates a relationship between a first portion of resource data and a second portion of the resource data. The user device provides, via an output device for a user interface, at least one visualization component that is described by the visualization data object. The user device receives, via an input device for the user interface, a modification input. The modification input describes a modified presentation of the visualization component. The user device determines, based on the modified presentation of the visualization component, a modified relationship between the first and second portions of the resource data. The user device provides, to the visualization generation computing system, modification input data that describes the modified relationship. The user device receives, from the visualization generation computing system, a modified visualization data object. The modified visualization data object includes a modified visualization component that describes the modified relationship. The user device provides, via the output device for a user interface, the modified visualization component.

According to certain embodiments, a visualization generation computing system determines a relationship between a first portion of resource data and a second portion of the resource data. The visualization generation computing system generates a visualization data object. The visualization data object indicates the relationship between the first and second portions of the resource data. The visualization generation computing system receives, from a user device, modification input data that describes an adjusted presentation of at least one visualization component described by the visualization data object. The visualization generation computing system determines, based on the adjusted presentation of the visualization component, a modified relationship between the first and second portions of the resource data. The visualization generation computing system modifies the visualization data object to include a modified visualization component. The modified visualization component describes the modified relationship. The visualization generation computing system provides the modified visualization data object to the user device. The user device is configured to present the modified visualization component via an output device for a user interface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where:

FIG. 1 is a diagram depicting an example of computing environment in which a visualization generation computing system provides visualization data objects to a user device, according to certain embodiments;

FIG. 2 is a diagram depicting an example of a computing environment that includes a visualization generation computing system having a projection generation module and a visualization generation module, according to certain embodiments;

FIG. 3 is a flow chart depicting an example of a process for providing or modifying a visualization data object, according to certain embodiments;

FIG. 4 is a flow chart depicting an example of a process for modifying a visualization data object based on a modified relationship of resource data, according to certain embodiments;

FIG. 6 is a block diagram depicting an example of a computing system for implementing a visualization generation computing system, according to certain embodiments.

DETAILED DESCRIPTION

Figure 5A:
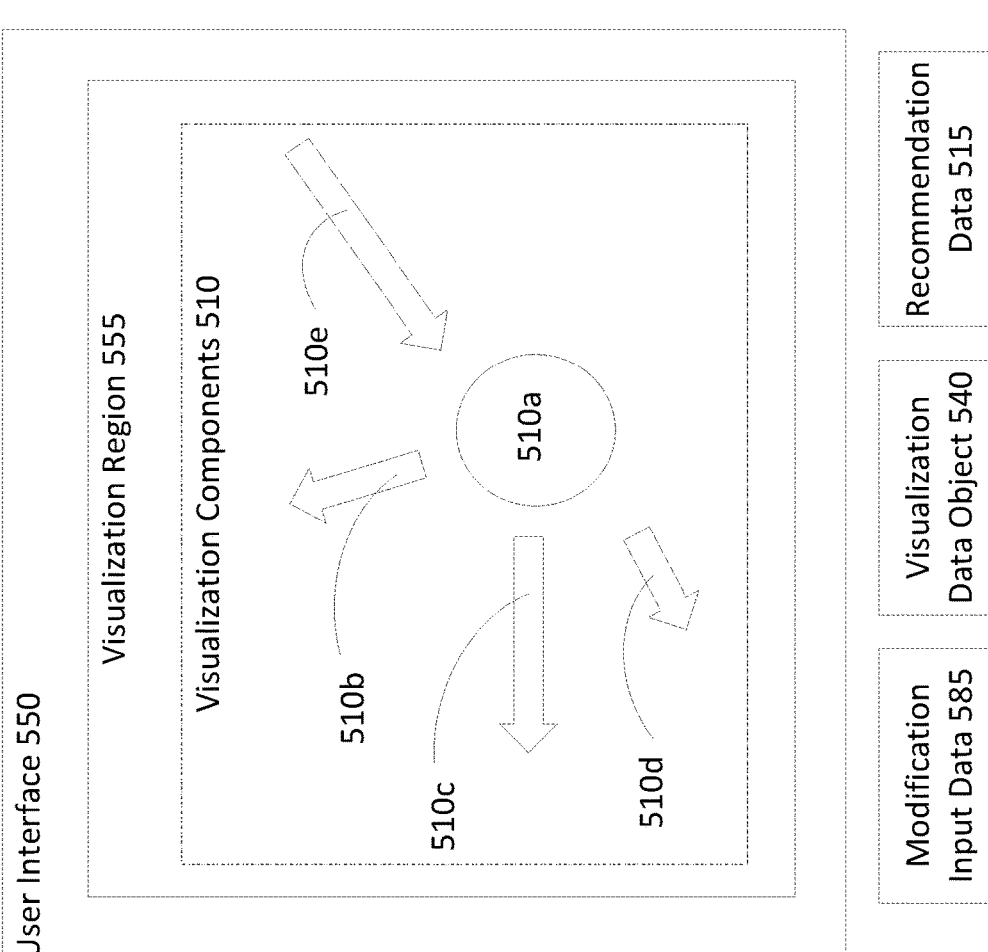
FIGS. 5a and 5b (collectively referred to herein as FIG. 5) are diagrams depicting examples of user interfaces configured to present data visualizations based on visualization data objects, according to certain embodiments.

As discussed above, prior techniques for presenting resource allocation data can be difficult to understand or modify. Contemporary user interfaces for computer-implemented resource allocation tools may present resource allocation data in graphs or numeric tables, without providing intuitive visualizations of the resource allocation data. In some cases, resource allocation data presented by the contemporary user interfaces can be difficult for individuals to interpret without training, such as training in project management or accounting. In addition, contemporary user interfaces for computer-implemented resource allocation tools may be limited as to the types of input data that are interpretable by the resource allocation tools, such as being limited to receiving language-based user inputs (e.g., text data describing alphanumeric input, audio data describing spoken commands).

In some cases, contemporary computer-implemented resource allocation tools do not provide user interfaces or data visualizations that are intuitive or simple for users to utilize. In addition, the example user interfaces or data visualizations provided by contemporary computer-implemented resource allocation tools may fail to provide non-language information, which can reduce or prevent comprehension by users, such as users with medical conditions that can impact language comprehension (e.g., dyslexia) or who speak a language that is different from the language used by the contemporary computer-implemented resource allocation tools.

Certain embodiments described herein provide for a visualization generation computing system that can provide an improved user interface which presents intuitive data visualizations describing resource allocation. In some cases, the visualization generation computing system can provide, via the user interface, non-language data visualization components or reduced-language data visualization components. In addition, the visualization generation computing system can receive, via the user interface and the intuitive data visualization components, non-language or reduced-language modification inputs that describe changes to the resource allocation described by the intuitive data visualizations. For example, the visualization generation computing system can generate a visualization data object that represents resource data, such as a visualization that uses shapes or other characteristics of the visualization components to describe financial data. The visualization data object can be presented via a user interface, e.g., of a user device. In response to receiving a modification input, such as a non-language modification input that drags the shape or another characteristic of the visualization components described by the visualization data object, the visualization generation computing system determines a modification to the represented resource data. The visualization generation computing system may update the visualization data object to indicate modifications to additional portions of the represented resource data, such as an impact on present resource allocation or future resource availability resulting from a modification input that increases current expenditure of resources. By interacting with the visualization data object, a user can more rapidly comprehend the resource data represented by the visualization data object. In addition, by interacting with the visualization data object, the user can, with increased speed and accuracy, understand potential impacts to the represented resource data, such as potential impacts that result from modified allocation of the resource that is represented by the resource data.

The following examples are provided to introduce certain embodiments of the present disclosure. In the example implementation, a visualization generation computing system generates a visualization data object. The visualization data object describes resource data that is associated with a user device (or a user account corresponding to the user device), such resource data that represents an resource corresponding to a user of the user device. As an example, the resource data could indicate allocation of a described resource, such as financial data indicating repayment of a loan, scheduling data indicating timed stages in a construction project, or other types of resources that can be allocated. In the example implementation, the visualization generation computing system generates the visualization data object based on one or more relationships determined among portions of the resource data. For example, a projection generation module included in the visualization generation computing system can calculate relationships among multiple portions of the resource data that describe respective portions of the resource, such as multiple portions of the example financial or scheduling data. In addition, a visualization generation module included in the visualization generation computing system could generate visualization components, such as non-language visualization components, that describe the relationships determined by the projection generation module. The example visualization data object includes the visualization components.

Continuing with this example implementation, the visualization generation computing system could provide the visualization data object to the user device for presentation via a user interface, such as presentation of the visualization components on a touch screen of a mobile device. In addition, the user device receives a modification input that adjusts the presentation of the visualization data object, such as a non-language modification input that changes a shape, placement, or other characteristic of a particular one of the visualization components. In addition, the visualization generation computing system receives from the user device modification input data that describes the adjusted presentation. In response to receiving the modification input data, the visualization generation computing system determines a modification of the resource data described by the visualization data object, such as a modification to a particular portion of the resource data. In some cases, the visualization generation computing system could implement the determined modification of the resource data, such as by changing an allocation of the described resource (e.g., adjusting a loan payment, rescheduling a project stage). In some cases, the visualization generation computing system could provide recommendation data describing the determined modification of the resource data, such as by providing the recommendation data to the user device (e.g., for presentation to the user).

Certain embodiments described herein provide improved techniques for generating intuitive data visualizations of resource data. For example, a visualization generation computing system can utilize particular rules to determine relationships among portions of resource data and to generate visualization components, including non-language visualization components that omit language data, that indicate the relationships among the resource data portions. The utilization of the particular rules can generate new or additional data objects—e.g., the visualization components, a visualization data object, recommendation data—that provide intuitive understanding of the resource data or the determined relationships, improving comprehension of the resource data or the determined relationships by a person who utilizes the visualization generation computing system (e.g., via a user device). In addition, the new or additional data objects can represent complex or specialized data (e.g., complex financial or scheduling data having multiple interrelated portions) using non-language visualization components or other aspects of the described techniques. In some cases, a visualization generation computing system using techniques described herein can improve understanding by a person about resource data, reducing or preventing errors that can be costly and may negatively impact the well-being of the person. In addition, a visualization generation computing system using techniques described herein can help a person to rapidly produce multiple potential resource allocations and receive accurate feedback about the multiple potential allocations, such as understanding tradeoffs that may result from the potential allocations or possible impacts on a goal of the person. In some cases, a visualization generation computing system using techniques described herein can improve human efforts to present data visualizations, such as by increasing accuracy of the visualizations and reducing human effort spent on converting numeric data to an intuitive data visualization, e.g., conversion of numeric data to non-language visualization components.

Referring now to the drawings, FIG. 1 is a diagram depicting an example of a computing environment 100, in which a visualization generation computing system 110 provides one or more visualization data objects to a user device 180. The user device 180 provides a user interface 150 that presents intuitive data visualizations based on the one or more visualization data objects, such as intuitive data visualizations of resource allocation. In addition, the user device 180 receives, via the user interface 150, one or more modification inputs that adjust the intuitive data visualizations, such as adjustments of a visualized resource allocation. In some cases, the one or more visualization data objects are modified by one or more of the visualization generation computing system 110 or the user device 180 based on the one or more modification inputs received via the user interface 150.

In the computing environment 100, the visualization generation computing system 110 includes a visualization generation module 120, a projection generation module 130, and at least one data repository, such as a resource data repository 105. The resource data repository 105 stores one or more types of resource data, such as resource data 102. The resource data 102 describes at least one resource corresponding to a user account that is associated with the user device 180. Examples of resources that can be described by resource data (e.g., the resource data 102) include financial resources, time resources, or other types of resources that can be allocated. In some cases, the resource data repository 105 describes types of resource data that can be allocated by a person, such as a person who utilizes the user account associated with the user device 180. FIG. 1 depicts the visualization generation computing system 110 as including the visualization generation module 120, the projection generation module 130, and the resource data repository 105, but other implementations are possible. For example, a visualization generation computing system could utilize a communication network to access one or more data repositories, projection generation modules, or visualization generation modules that are implemented by one or more additional computing systems.

In some implementations, the visualization generation computing system 110 generates (or otherwise receives) a visualization data object 140. For example, the visualization generation module 120 could generate the visualization data object 140 based on resource relationship data calculated by the projection generation module 130. The visualization data object 140 describes at least a portion of the resource data 102 that is associated with the user account of the user device 180. For example, the visualization data object 140 can describe financial data that is included in the resource data 102. In addition, the visualization data object 140 can include one or more visualization components that describe the resource data 102. Continuing with the example of financial data, the visualization components can indicate financial inflows (e.g., payroll entries), financial outflows (e.g., paid expenses), time variations (e.g., loan payments, compounded interest), expected events (e.g., data indicating an upcoming vacation), or other types of activities that impact an allocation of the resource described by the resource data 102.

In some cases, one or more of the visualization components in the visualization data object 140 are non-language visualization components or reduced-language visualization components. For example, a non-language visualization component can describe the resource data 102 while omitting language data (e.g., alphanumeric text, verbal audio data) that describes the resource data 102. Examples of non-language visualization components include shapes, colors, patterns, arrows, orientation (e.g., of a shape, of an arrow), placement (e.g., of a shape, of an arrow), non-verbal sound (e.g., chime noises, buzzer noises), haptic output (e.g., vibration), or other types of visualization components that exclude language data. In some cases, the visualization data object 140 includes a reduced-language visualization component that includes a portion of language data in combination with a non-language visualization component that describes the resource data 102. As used herein, "reduced-language visualization component" refers to a visualization component that includes a combination of language data with at least one non-language visualization component, wherein resource data is described by the at least one non-language visualization component and the language data describes a characteristic of the resource data that is also described by the at least one non-language visualization component. In some implementations, the visualization generation computing system 110 could modify one or more visualization components in the visualization data object 140 to improve accessibility for a particular user. For example, the visualization generation computing system 110 could modify a color non-language visualization component to utilize visual patterns or different colors to improve accessibility for a user who has color vision deficiency. In addition, the visualization generation computing system 110 could modify a sound non-language visualization component to utilize vibration or shape to improve accessibility for a user who is hearing impaired.

In FIG. 1, the visualization data object 140 includes data that indicates one or more visualization components, such as visualization data 142. The visualization data 142 can include data that indicates one or more non-language visualization components, such as a non-language visualization component 144. As an example, the visualization data 142 describes a financial resource that is indicated by the resource data 102. In this example, the non-language visualization component 144 describes a particular financial inflow from the described financial resource. Continuing with this example, the non-language visualization component 144 is a geometric form that describes an amount and timing of the particular financial inflow via shape, color, placement, or other characteristics of the geometric form. In some cases, the visualization data 142 can include data that indicates one or more reduced-language visualization components. Continuing with the example financial resource indicated by the resource data 102, the non-language visualization component 144 could be included in a reduced-language visualization component of the visualization data 142, such as a reduced-language visualization component that combines the non-language visualization component 144 with language data. In this example, the amount and timing of the particular financial inflow are understandable (e.g., by a user) via the characteristics of the geometric form of the non-language visualization component 144, and the language data or the reduced-language visualization component could be omitted without disrupting understanding of the amount and timing of the particular financial inflow.

In the computing environment 100, the visualization generation computing system 110 provides the visualization data object 140 to the user device 180, such as by transmitting the visualization data object 140 via one or more communication networks (e.g., a local area network, a wide area network). In addition, the user device 180 interprets data included in the visualization data object 140. For example, the user device 180 configures the user interface 150 to present the one or more visualization components indicated by the visualization data 142. In FIG. 1, the user device 180 includes one or more user interface output devices 156, each of which can be configured to present at least a portion of the user interface 150 (e.g., a video portion, an audio portion). In addition, the user device 180 includes one or more user interface input devices 154, each of which can be configured to receive a user input, such as a modification input, to the user interface 150 (e.g., a mouse input, a microphone input). Examples of user interface output devices can include monitors, touchscreens, speakers, headphones, vibration components (e.g., included in an additional user interface input/output device), virtual reality devices (e.g., visors), augmented reality devices, or other output devices that can provide a portion of a computer-implemented user interface. Examples of user interface input devices can include mice, touchscreens, handheld controllers (e.g., gamepads, virtual reality controllers), keyboards, microphones, motion-detection components (e.g., included in an additional user interface input/output device), or other input devices that can receive a user input to a computer-implemented user interface.

Responsive to receiving the visualization data object 140, the user device 180 interprets data included in the visualization data object 140, such as the visualization data 142. For example, the user device 180 configures the user interface 150 to present a visualization region 155. In addition, the user device 180 configures the user interface 150 to present, via the visualization region 155, the one or more visualization components indicated by the visualization data 142. For example, the user device 180 configures the user interface 150 to present the non-language visualization component 144 via the visualization region 155. A person who is utilizing the user device 180 can intuitively comprehend the particular financial inflow described by the non-language visualization component 144, as well as other portions of the resource data 102 represented via visualization components in the visualization data 142. In addition, the person who is utilizing the user device 180 can intuitively interact with the resource data 102 represented via the visualization data 142, by interacting with visualization components presented in the visualization region 155. For example, the user interface 150 may receive one or more modification inputs that modify a presentation (e.g., via the visualization region 155) of the non-language visualization component 144. As an example, the person who is utilizing the user device 180 could provide modification inputs that adjust a size, shape, placement, or other characteristics of the non-language visualization component 144 within the visualization region 155. Responsive to receiving the one or more modification inputs, the user device 180 can generate modification input data 185 that describes the adjustments to the characteristics of the non-language visualization component 144.

In the computing environment 100, the user device 180 provides the modification input data 185 to the visualization generation computing system 110. Responsive to receiving the modification input data 185, the visualization generation computing system 110 determines one or more modifications to the resource data 102 that correspond to the modified presentation of the non-language visualization component 144. Continuing with the example of the particular financial inflow described by the non-language visualization component 144, the visualization generation computing system 110 could determine that a first modification input which increases (or decreases) a size of the non-language visualization component 144 corresponds to an increase (or decrease) in an amount of the particular financial inflow. In some cases, the visualization generation computing system 110 determines one or more modified relationships among multiple portions of the resource data 102, such as a relationship between a first portion and a second portion of the resource data 102. In the example of the particular financial inflow, the visualization generation computing system 110 could determine that a second modification input which adjusts a placement of the non-language visualization component 144 (e.g., placement within the visualization region 155) corresponds to an adjustment to a timing of the particular financial inflow. In addition, the visualization generation computing system 110 could determine that the adjustment to the timing, e.g., corresponding to the second modification input, modifies a relationship among portions of the resource data 102, such as a relationship between the particular financial inflow and an additional financial payment that is indicated by the resource data 102.

In some implementations, the visualization generation computing system 110 identifies, based on the modification input data 185, one or more constraints among multiple portions of the resource data 102. In some cases, the visualization generation computing system 110 identifies the one or more constraints based on the one or more modified relationships among multiple portions of the resource data 102. Continuing with the example of the particular financial inflow, the visualization generation computing system 110 could determine that the second modification input, e.g., corresponding to the adjustment to the timing of the particular financial inflow, modifies a relationship among portions of the resource data 102, e.g., the relationship between the particular financial inflow and the additional financial payment. Responsive to determining the modified relationship, the visualization generation computing system 110 could identify a constraint between the portions of the resource data 102 indicating the particular financial inflow and the additional financial payment. The identified constraint, for example, could indicate that the adjustment to the timing of the particular financial inflow has a relatively high probability (e.g., above a threshold probability) of causing the additional financial payment to fail, such as a failure due to insufficient funds. Based on the identified constraint, the visualization generation computing system 110 could generate recommendation data 115. In some cases, the recommendation data 115 could indicate the identified constraint, such as alert data describing the potential failure of the additional financial payment. In some cases, the recommendation data 115 could include a modification of the visualization data object 140. For example, the recommendation data 115 could include a modified visualization data object indicating an alternative presentation of the visualization data 142, such as additional visualization data that indicates an alternative shape, size, placement, or other characteristic of the non-language visualization component 144.

In FIG. 1, the visualization generation computing system 110 provides the recommendation data 115 to the user device 180. Responsive to receiving the recommendation data 115, the user device 180 configures the user interface 150 to modify the visualization region 155. For example, responsive to determining that the recommendation data 115 includes the alert data, the user device 180 configures the user interface 150 to present, via the visualization region 155, an alert visualization component. In addition, the alert visualization component intuitively indicates, e.g., to the person who is using the user device 180, that the modification inputs described by the modification input data 185 could violate a constraint on the financial resources described by the resource data 102. In some cases, the alert visualization component is a non-language visualization component, such as a buzzer noise, a red color, a particular shape, or another non-language visualization component suitable for alerting a user.

In addition, responsive to determining that the recommendation data 115 indicates the modification of the visualization data object 140, the user device 180 configures the user interface 150 to present, via the visualization region 155, the additional visualization data indicating the alternative characteristic of the non-language visualization component 144. In some cases, the alternative characteristic modifies the non-language visualization component 144 while omitting language data, e.g., the modified non-language visualization component 144 remains a non-language visualization component. In addition, the alternative characteristic of the non-language visualization component 144 intuitively indicates, e.g., to the person who is using the user device 180, a potential reallocation of the financial resources described by the resource data 102 without violating a constraint on the financial resources, such as a potential reallocation that describes a modified timing for a particular financial outflow (e.g. delaying a purchase). Using the above example identified constraint that describes the potential failure of the additional financial payment, the alternative characteristic could be an alternative placement of the non-language visualization component 144 within the visualization region 155, intuitively indicating an alternative timing of the particular financial inflow that is less likely to cause failure of the additional financial payment.

In some cases, a visualization generation computing system generates one or more data objects that provide, e.g., via a user interface, intuitive data visualizations of resource data that is difficult or potentially impossible for a human to comprehend. For example, the visualization generation computing system could generate a visualization data object based on large quantities of resource data, such as quantities of data that are large enough to be difficult for a person to comprehend. In some cases, the visualization generation computing system could generate a visualization data object based on resource data arranged in specialized formats, such as resource data arranged in accounting notation, project engineering notation, or other specialized formats that are intended for interpretation only by a person who has specialized training and which could prevent or reduce comprehension by a person who lacks the specialized training. In some cases, the visualization generation computing system could generate a visualization data object based on resource data arranged in a form that is not intended for human interpretation, such as densely arranged resource data intended for interpretation by a computing system. The visualization generation computing system could include at least one projection generation module that is configured to determine one or more relationships among multiple portions of resource data that are difficult or potentially impossible for a human to comprehend. The projection generation module could be configured to generate relationship data that describes the determined relationships. In addition, the visualization generation computing system could include at least one visualization generation module that is configured to generate one or more visualization data objects based on the generated data, such as a visualization data object that describes the determined relationships among the portions of resource data.

FIG. 2 is a diagram depicting an example of a computing environment 200 that includes a visualization generation computing system 210 and one or more user devices, such as a user device 280. The user device 280 provides a user interface 250 that is configured to present intuitive data visualizations that include one or more non-language visualization components based on one or more visualization data objects received from the visualization generation computing system 210, such as generally described in regard to FIG. 1. The intuitive data visualizations can include one or more non-language visualization components, such as the non-language visualization component 144. In addition, the user device 280 can generate modification input data in response to receiving, e.g., via the user interface 250, one or more modifications inputs that modify a presentation of one or more visualization components in the intuitive data visualizations, such as generally described in regard to FIG. 1.

In the computing environment 200, the visualization generation computing system 210 includes one or more of a visualization generation module 220 or a projection generation module 230. In addition, the visualization generation computing system 210 includes (or otherwise can access) one or more data repositories, such as a group of data repositories 205. In FIG. 2, the group of data repositories 205 includes one or more of a resource data repository 205a, a user behavior data repository 205b, or an environmental data repository 205c. For example, the resource data repository 205a could store one or more types of resource data, such as generally described in regard to FIG. 1. The resource data stored in the resource data repository 205a could describe at least one resource corresponding to a user account that is associated with the user device 280. In some cases, the resource data repository 205a describes types of resources that can be allocated by a person, such as a person who utilizes the user account associated with the user device 280. In addition, the user behavior data repository 205b could store user behavior data that describes, for example, actions by the person who utilizes the user account associated with the user device 280. Examples of user behavior data could include activity data describing historical actions by a person (e.g., scheduled events on a calendar, interactions with a website describing financial savings strategies), credit data describing previous allocation of a described resource (e.g., successful repayment of a loan, a missed payment), or other types of data that describe user behavior, such as behavior of the person who utilizes the user account associated with the user device 280. In addition, the environmental data repository 205c could store environmental data that describes, for example, external conditions that are not set by the person who utilizes the user account associated with the user device 280. Examples of environmental data could include economic data (e.g., interest rates, inflation, cost of living estimates), regulatory data (e.g., required inspections for a multi-stage project), or other types of data describing environmental circumstances that are typically beyond control of a particular person, such as the person who utilizes the user account associated with the user device 280.

In FIG. 2, the projection generation module 230 identifies, from the data repositories 205, multiple portions of data that are associated with the user device 280. In some cases, the projection generation module 230 identifies the multiple portions of data in response to a request, such as request data received from the user device 280. For example, the projection generation module 230 could identify, from the resource data repository 205*a*, a first portion of resource data 202*a*, a second portion of resource data 202*b*, and a third portion of resource data 202*c* (collectively referred to herein as resource data 202). The identified portions of the resource data 202 could include data describing a resource allocated by the person who utilizes the user account associated with the user device 280. In some cases, the projection generation module 230 can identify additional portions of data from additional ones of the data repositories 205, such as a portion of user behavior data from the user behavior data repository 205*b* or a portion of environmental data from the environmental data repository 205*c*. In addition, the projection generation module 230 can include the additional portions of data in the resource data 202. In FIG. 2, the resource data 202 includes resource data that is difficult or potentially impossible for a human to comprehend, such as large quantities of resource data, resource data arranged in specialized formats, or resource data arranged in a form that is not intended for human interpretation. For example, the resource data 202 could include large quantities of financial data arranged in one or more specialized formats.

In some cases, the projection generation module 230 determines a particular resource allocation that is described by a particular portion of the resource data 202. For example, based on analysis of the resource data 202, the projection generation module 230 could determine that the first portion of resource data 202*a* indicates a resource allocation goal, such as a goal to pay off a loan, schedule time for a multi-stage project, or other type of resource allocation goal. In addition, the projection generation module 230 could determine that the second portion of resource data 202*b* indicates a resource inflow, such as a payroll entry, a weekly calendar event, or other type of inflow for the described allocated resource. Further, the projection generation module 230 could determine that the third portion of resource data 202*c* indicates a resource outflow, such as a recurring payment, a weekly schedule commitment, or other type of outflow for the described allocated resource. In some cases, the projection generation module 230 determines a particular resource allocation that is described by numeric or alphanumeric data that is included in the resource data 202.

In the visualization generation computing system 210, the projection generation module 230 determines one or more relationships among the portions of data that are included in the resource data 202. In addition, the projection generation module 230 generates (or modifies) relationship data 235 that describes the one or more relationships, such as a relationship that is determined based on analysis of the resource data 202. For example, the projection generation module 230 could determine a first relationship between the resource data 202*b* and the resource data 202*c*, such as a first relationship indicating that the resource inflow indicated by the resource data 202*b* exceeds (or does not exceed) the resource outflow indicated by the resource data 202*c*. In addition, the projection generation module 230 could determine a second relationship among the resource data 202*a*, 202*b*, and 202*c*, such as a second relationship indicating that, given a calculated difference between the resource inflow indicated by the resource data 202*b* and the resource outflow indicated by the resource data 202*c*, the resource allocation goal indicated by the resource data 202*a* could be achieved in a particular time period (e.g., four months). Additional relationships could be determined among the portions of the resource data 202, for example, additional relationships among the portion of user behavior data from the data repository 205*b*, the portion of environmental data from the data repository 205*c*, or one or more of the resource data 202*a*, 202*b*, or 202*c*.

In some cases, the projection generation module 230 determines one or more relationships that describe constraints among the portions of data that are included in the resource data 202. In addition, the projection generation module 230 generates (or modifies) the relationship data 235 to describe the one or more constraint relationships. For example, the projection generation module 230 could determine that the resource data 202 describes multiple resource allocation goals, such as a first goal to pay off a loan and a second goal to save for retirement. In addition, the projection generation module 230 could determine a constraint relationship between the multiple resource allocation goals, such as a constraint describing a threshold (e.g., resource outflow should not exceed a threshold level of resource inflow) or a constraint describing a tradeoff (e.g., paying off the loan reduces savings for retirement while increasing retirement savings delays paying off the loan). In some cases, a particular constraint relationship could indicate an effect of time on the constraint, such as an effect of advancing or delaying an allocation towards a goal (e.g., an effect on accrued interest over time, an effect on timing for additional goals or obligations).

In some cases, the projection generation module 230 determines one or more probabilities associated with the relationships among the portions of data that are included in the resource data 202. In addition, the projection generation module 230 generates (or modifies) the relationship data 235 to describe the one or more probabilities. For example, the projection generation module 230 could determine that the resource outflow indicated by the resource data 202*c* has increased during a period of time, e.g., the person associated with the user device 280 has increased their spending. In addition, the projection generation module 230 could determine a probability associated with the first relationship between the resource data 202*b* and the resource data 202*c*, such as a probability indicating that, given the increase of the resource outflow during the period of time, the resource outflow has a particular likelihood of exceeding the resource inflow indicated by the resource data 202*b* during an additional period of time, e.g., a probability of budget overrun.

In the visualization generation computing system 210, the visualization generation module 220 generates one or more visualization data objects, such as the visualization data object 240, based on one or more of the resource data 202 and the relationship data 235. For example, based on a combination of the resource data 202 and the relationship data 235, the visualization generation module 220 generates data that indicates one or more visualization components, such as visualization data 242 that is included in the visualization data object 240. In addition, the visualization generation module 220 generates one or more non-language visualization components that are included in the visualization data 242, such as by calculating one or more a geometric form, a placement (e.g., as presented by the user interface 250), a sound, or other non-language visualization components that correspond to the relationships, constraint relationships, and probabilities represented by the relationship data 235. In some cases, the visualization generation module 220 generates non-language visualization components that describe numeric or alphanumeric relationships calculated by the projection generation module 230. For example, the visualization generation module 220 can determine a non-language visualization component that describes at least one of the relationships among the portions of data that are included in the resource data 202. In addition, the visualization generation module 220 can determine a non-language visualization component that describes at least one of the constraint relationships among the portions of data that are included in the resource data 202. Further, the visualization generation module 220 can determine a non-language visualization component that describes at least one of the probabilities associated with the relationships among the portions of data that are included in the resource data 202. In some cases, the visualization generation module 220 determines a particular non-language visualization component that describes a particular section of the relationship data 235, such as a particular non-language visualization component describing one of a particular relationship, a particular constraint relationship, or a particular probability represented by the relationship data 235. In some cases, the visualization generation module 220 determines a particular non-language visualization component that describes multiple sections of the relationship data 235, such as a particular non-language visualization component describing multiple relationships, a relationship and also an associated probability, or other combinations of the relationships, constraint relationships, and probabilities represented by the relationship data 235.

In the computing environment 200, the visualization generation computing system 210 provides the visualization data object 240 to the user device 280. In addition, the user device 280 configures the user interface 250 to present the one or more visualization components indicated by the visualization data 242, such as generally described in regard to FIG. 1. A person who is utilizing the user device 280 can intuitively comprehend the relationships, constraint relationships, probabilities, or other portions of the resource data 202 represented via visualization components in the visualization data 242. In addition, the person who is utilizing the user device 280 can intuitively interact with the resource data 202 represented via the visualization data 242, by interacting with visualization components presented via the user interface 250. For example, the user interface 250 may receive one or more modification inputs that modify a presentation of one or more non-language visualization components included in the visualization data 242, such as non-language modification inputs that adjust a size, shape, placement, or other characteristics of a non-language visualization component. Responsive to receiving the one or more modification inputs, the user device 280 can generate modification input data 285 that describes the adjustments to the one or more non-language visualization components.

In the computing environment 200, the user device 280 provides the modification input data 285 to the visualization generation computing system 210. Responsive to receiving the modification input data 285, the visualization generation computing system 210 determines one or more modifications to the resource data 202. For example, the visualization generation module 220 calculates, based on the modification input data 285, an adjustment to one or more visualization components included in the visualization data 242. In addition, the visualization generation module 220 identifies one or more portions of the resource data 202 or the relationship data 235 that correspond to the calculated adjustment. The visualization generation module 220 generates resource modification data 225 that describes the calculated adjustment and the one or more corresponding portions of the resource data 202 or the relationship data 235. In some cases, the visualization generation computing system 210 modifies one or more of the resource data 202 or the data repositories 205 based on the resource modification data 225. For example, the projection generation module 230 could determine that the resource modification data 225 describes an adjustment to the allocation of the resource data 202, e.g., an allocation adjustment indicated by the modified presentation of the visualization components provided via the user interface 250. Responsive to determining that the resource modification data 225 describes an adjustment to the allocation of the resource data 202, the projection generation module 230 can modify one or more of the resource data 202 or the resource data repository 205a, such as by modifying the particular resource allocation that is described by the resource data 202. In some cases, the visualization generation computing system 210 modifies the visualization data object 240 based on one or more of the modification input data 285 or the resource modification data 225. For example, the visualization generation module 220 could modify the visualization data 242 to indicate the adjustment to the allocation of the resource data 202. In some cases, the visualization generation module 220 could modify the visualization data 242 to indicate a constraint relationship, such as a constraint that could prevent the adjustment to the allocation of the resource data 202. In some cases, the visualization generation computing system 210 provides one or more of the modified visualization data object 240 or recommendation data (as generally described in regard to FIG. 1) to the user device 280.

In FIG. 2, the visualization generation computing system 210 is described as calculating an adjustment to visualization components included in the visualization data 242 based on the modification input data 285, and also is described as generating the resource modification data 225. However, other implementations are possible. For example, an additional user device that receives a visualization data object (e.g., from an additional visualization generation computing system) could be configured to calculate an adjustment to visualization components included in the visualization data object. In addition, the additional user device could be configured to generate resource modification data based on the calculated adjustments. In some cases, the additional user device could be configured to provide the resource modification data to the additional visualization generation computing system.

In some cases, the visualization data 242, the visualization data object 240, and other portions of the visualization generation computing system 210 can improve comprehension of the resource data 202 for the person who utilizes the user device 280. In addition, the visualization data 242, visualization data object 240, and other portions of the visualization generation computing system 210 can facilitate interactions of the person who utilizes the user device 280 with the resource data 202. For example, the one or more non-language visualization components in the visualization data 242 that are provided via the user interface 250 can improve the person's comprehension of portions of the resource data 202 that are difficult or potentially impossible for a human to comprehend, such as large quantities of resource data, resource data arranged in specialized formats, or resource data arranged in a form that is not intended for human interpretation. In addition, the described techniques to indicate adjustments to the resource data 202, e.g., via non-language modification inputs, can increase accuracy for or otherwise facilitate the person's interactions with the resource data 202, such as by allowing the person to indicate reallocation (or other adjustments) of the resource described by the resource data 202. In some cases, the described techniques to indicate adjustments to the resource data 202 can increase accuracy for or otherwise facilitate the person's interactions with the resource data 202, even in cases where the person might lack specialized training to interact with portions of the resource data 202, e.g., portions of the resource data arranged in specialized formats.

FIG. 3 is a flow chart depicting an example of a process 300 for providing or modifying a visualization data object. In some embodiments, such as described in regards to FIGS. 1-2, a user computing device that includes a user interface implements operations described in FIG. 3, by executing suitable program code. In some cases, such as described in regards to FIGS. 1-2, the user computing device is in communication with a visualization generation computing system. For illustrative purposes, the process 300 is described with reference to the examples depicted in FIGS. 1-2. Other implementations, however, are possible.

At block 310, the process 300 involves receiving at least one visualization data object, such as a user device that receives a visualization data object from a visualization generation computing system. In some cases, the visualization data object can indicate a relationship between (or among) multiple portions of resource data. In addition, the resource data can describe a resource that corresponds to the user device, or a user account associated with the user device. For example, the user device 180 can receive the visualization data object 140 from the visualization generation computing system 110. In addition, the visualization data object 140 can describe one or more relationships among multiple portions of the resource data 102, which describes a resource that corresponds to a user account associated with the user device 180.

At block 320, the process 300 involves providing the visualization data object, or a visualization component indicated by the visualization data object, via one or more user interface devices, such as at least one user interface output device. In some cases, the visualization data object includes visualization data that indicates one or more visualization components, such as at least one non-language visualization component. In addition, the one or more visualization components can describe the resource data or the relationships among the multiple portions of the resource data. In some cases, the user device is configured to provide the one or more visualization components via the at least one user interface output device. For example, the user device 180 is configured to provide the non-language visualization component 144 via the user interface 150 (e.g., the visualization region 155). In some implementations, the visualization data object describes at least one non-language visualization component that is included in a reduced-language visualization component which also includes language data. In some implementations, the visualization data object describes at least one non-language visualization component that omits language data and is not associated with (e.g., included in, displayed with) a reduced-language visualization component.

At block 330, the process 300 involves receiving one or more modification inputs, such as a modification input that is received by the user device via the one or more user interface devices. In some cases, the modification inputs modify a presentation of one or more visualization components that are provided by the user interface devices. For example, the user device 180 could receive one or more modification inputs via the user interface 150. In addition, the modification inputs received by the user device 180 could modify a presentation of the non-language visualization component 144, such as modification inputs that adjust a size, shape, placement, or other characteristics (e.g., presentation characteristics) of the non-language visualization component 144 within the visualization region 155. In some implementations, modification input data is generated by the user device, such as modification input data that is based on the received modification inputs. For example, the user device 180 can generate modification input data 185 that is based on the modification inputs received via the user interface 150.

At block 340, the process 300 involves determining a modified relationship of the resource data indicated by the visualization data object, such as a modified relationship between (or among) the multiple portions of resource data. In some implementations, the user device determines the modified relationship of the multiple portions of resource data. For example, based on the modification inputs that adjust the non-language visualization component 144 within the visualization region 155, the user device 180 can determine a modified relationship among multiple portions of resource data that are described by the non-language visualization component 144. In some implementations, the visualization generation computing system (e.g., from which the visualization data object was received by the user device) determines the modified relationship of the multiple portions of resource data. For example, in response to receiving the modification input data 185 from the user device 180, the visualization generation computing system 110 can determine a modified relationship among multiple portions of the resource data 102. In some cases, based on the modified relationship, the user device or the visualization generation computing system determines one or more constraints between (or among) the multiple portions of the resource data.

At block 350, the process 300 involves providing, to the visualization generation computing system, data that describes one or more of the modified relationship or the modification input. In some cases, the user device provides to the visualization generation computing system data that describes the modified relationship that is determined by the user device. For example, the user device 180 can provide to the visualization generation computing system 110 data that describes the modified relationship among the multiple portions of resource data. In some cases, the user device provides to the visualization generation computing system the modification input data that is generated by the user device based on the received modification inputs. For example, the user device 180 can provide the modification input data 185 to the visualization generation computing system 110. In some implementations, one or more operations related to block 350 are omitted. For instance, if the user device determines the modified relationship of the multiple portions of resource data as described in regard to block 340, the user device may omit operations related to providing data that describes the modified relationship to the visualization generation computing system.

At block 360, the process 300 involves receiving a modified visualization data object. The modified visualization data object can include one or more modified visualization components, such as additional visualization data that describes one or more alternative characteristics (e.g. alternative presentation characteristics) of at least one visualization component. For example, the user device 180 can receive, from the visualization generation computing system 110, a modification of the visualization data object 140, such as a modified visualization data object included in the recommendation data 115. In some cases, the modification of the visualization data object 140 can include additional visualization data that describes one or more alternative characteristics (e.g. alternative presentation characteristics) of the non-language visualization component 144. In some cases, receiving a modified visualization data object includes generating the modified visualization data object, such as a modified visualization data object that is generated by the user device by determining an alternative characteristic of a visualization component based on the determined modified relationship. In some cases, receiving a modified visualization data object includes receiving the modified visualization data object from an additional computing system, such as a modified visualization data object that is received by the user device from the visualization generation computing system.

At block 370, the process 300 involves providing the modified visualization data object via one or more of the user interface devices, such as the at least one user interface output device of the user device. In some cases, providing the modified visualization data object includes configuring the one or more user interface devices to present one or more alternative characteristics (e.g. alternative presentation characteristics) of at least one visualization component indicated by the modified visualization data object. For example, responsive to receiving the modification of the visualization data object 140 (e.g., indicated by the recommendation data 115), the user device 180 configures the user interface 150 to present the additional visualization data indicating the alternative characteristic of the non-language visualization component 144. In some cases, the modified visualization data object describes a modification to a visualization component, such that the modified visualization component is a non-language visualization component. For example, based on the additional visualization data, the user device 180 can present the alternative characteristics of the non-language visualization component 144 such that the modified presentation of the non-language visualization component 144 is also a non-language visualization component.

FIG. 4 is a flow chart depicting an example of a process 400 for modifying a visualization data object based on a modified relationship of resource data. In some embodiments, such as described in regards to FIGS. 1-3, a visualization generation computing system implements operations described in FIG. 4, by executing suitable program code. In some cases, such as described in regards to FIGS. 1-3, the visualization generation computing system is in communication with a user computing device. For illustrative purposes, the process 400 is described with reference to the examples depicted in FIGS. 1-3. Other implementations, however, are possible.

At block 410, the process 400 involves determining, such as by a visualization generation computing system, one or more relationships between or among multiple portions of resource data. In some cases, the resource data can describe a resource that corresponds to a user device that is capable of communicating with the visualization generation computing system, or a user account associated with the user device. For example, the visualization generation computing system 210 can determine one or more relationships between or among portions of the resource data 202. In some implementations, the relationship is determined by one or more components of the visualization generation computing system, such as by a projection generation module that is included in the visualization generation computing system. For example, in the visualization generation computing system 210, the projection generation module 230 determines the relationship between or among the multiple portions of the resource data 202. In addition, the projection generation module 230 generates (or modifies) the relationship data 235 that describes the one or more determined relationships.

At block 420, the process 400 involves generating, such as by the visualization generation computing system, one or more visualization data objects that indicate the one or more determined relationships. In some cases, the visualization generation computing system generates the one or more visualization data objects based on a combination of the one or more determined relationships and the resource data. In some implementations, the visualization data object is generated by one or more components of the visualization generation computing system, such as by a visualization generation module that is included in the visualization generation computing system. For example, in the visualization generation computing system 210, the visualization generation module 220 can generate the visualization data object 240 based on a combination of the resource data 202 and the relationship data 235. In some cases, the visualization data object includes visualization data that indicates one or more visualization components that indicate the determined relationships, such as at least one non-language visualization component. For example, the visualization generation module 220 generates the visualization data 242 that is included in the visualization data object 240. In addition, the visualization data 242 indicates at least one non-language visualization component that indicates one or more relationships described by the relationship data 235, such as a relationship determined by the projection generation module 230. In some implementations, the one or more visualization data objects are provided to at least one additional computing system, such as to the user device that is capable of communicating with the visualization generation computing system.

At block 430, the process 400 involves receiving, by the visualization generation computing system, one or more modification inputs. In addition, the one or more modification inputs describe a modified presentation of the visualization data object or a visualization component described by the visualization data object. In some cases, the one or more modification inputs are received from at least one additional computing system, such as from the user device. In addition, the modification inputs can be described by data received by the visualization generation computing system, such as modification input data that is received from the user device. For example, the visualization generation computing system 210 receives the modification input data 285 from the user device 280. In addition, based on the modification input data 285, the visualization generation module 220 determines an adjustment to a presentation, e.g., via the user device 280, of one or more visualization components indicated by the visualization data 242.

At block 440, the process 400 involves determining, by the visualization generation computing system, one or more modified relationships between or among the multiple portions of the resource data. In addition, the visualization generation computing system determines the one or more modified relationships based on the received one or more modification inputs. In some cases, the one or more modified relationships are determined by one or more components of the visualization generation computing system, such as by the visualization generation module. For example, the visualization generation module 220 calculates, based on the modification input data 285, one or more adjustments to at least one visualization component included in the visualization data 242. In addition, the visualization generation module 220 generates the resource modification data 225 describing the calculated adjustment and one or more portions of the resource data 202 that correspond to the calculated adjustment. For example, the resource modification data 225 can describe at least one modified relationship among the portions of the resource data 202, such as an adjusted resource allocation indicated by the presentation adjustment described by the modification input data 285.

At block 450, the process 400 involves modifying, by the visualization generation computing system, one or more of the visualization data objects to indicate the one or more modified relationships. In some cases, the one or more modified visualization data objects include one or more modified visualization components (e.g., additional visualization data describing alternative presentation characteristics) that are calculated by the visualization generation computing system based on the determined modified relationships. For example, based on the resource modification data 225, the visualization generation computing system 210 can modify the visualization data object 240 or the visualization data 242 to indicate the at least one modified relationship calculated by the visualization generation module 220, such as a modified visualization component that indicates the adjusted resource allocation described by the resource modification data 224.

At block 460, the process 400 involves modifying, by the visualization generation computing system, one or more portions of the resource data, based on the one or more determined modified relationships. In some cases, the projection generation module (or another component of the visualization generation computing system) determines that the one or more modified relationships describe an allocation adjustment the resource that is described by the resource data. In addition, the projection generation module (or another component of the visualization generation computing system) modifies at least a portion of the resource data to implement the resource allocation adjustment described by the modified relationships. For example, the projection generation module 230 can determine that the resource modification data 225 describes an adjustment to the allocation of the resource described by the resource data 202. In addition, the projection generation module 230 can modify the resource data 202 to implement the allocation of the described resource. Examples of implementing an allocation of a resource can include transferring resources (e.g., moving financial resources among accounts, transferring personnel assigned to a project), modifying a recurring resource event (e.g., monthly payments), or other changes to an allocation of a resource.

In some implementations, one or more operations related to blocks 450 or 460 are omitted. For instance, responsive to determining one or more modified relationships among portions of resource data, a visualization generation computing system may perform operations to modify a visualization data object and omit operations to modify a portion of the resource data. In addition, responsive to determining one or more modified relationships among portions of resource data, a visualization generation computing system may omit operations to modify a visualization data object and perform operations to modify a portion of the resource data.

Figure 5B:
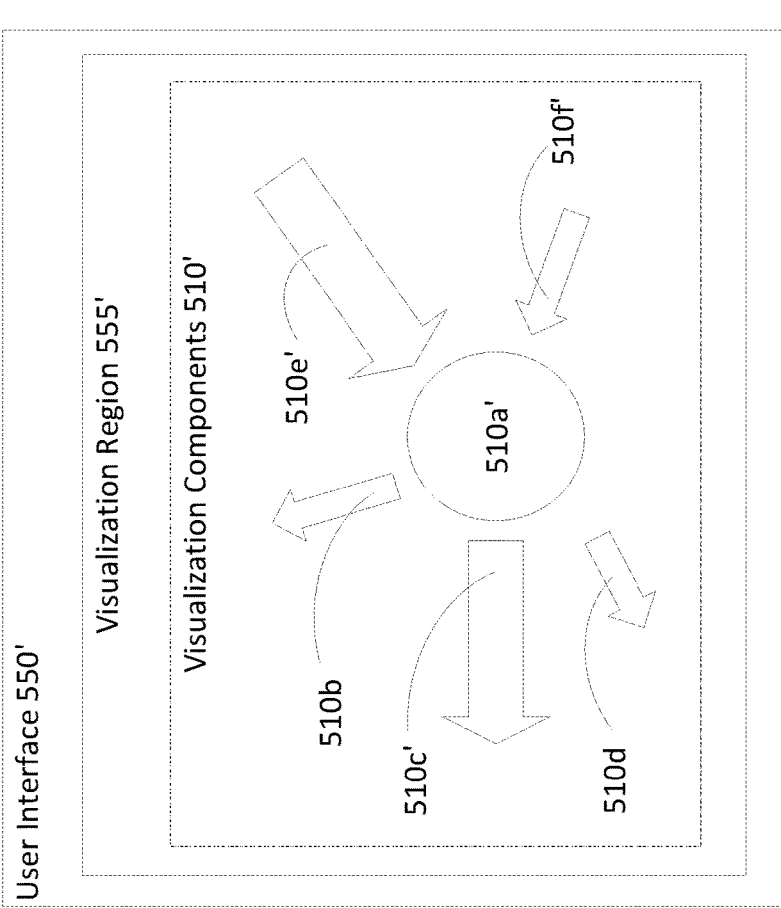

FIGS. 5*a* and 5*b* include diagrams depicting examples of visualization components, such as non-language visualization components, that can be depicted via a user interface. In the FIGS. 5*a* and 5*b*, the example visualization components are associated with a resource that is available for allocation, such as by a person who is utilizing the example user interfaces. The example visualization components described in regard to FIGS. 5*a* and 5*b* may be generated, modified, or provided by a visualization generation computing system or a user device that is in communication with a visualization generation computing system, such as described elsewhere herein. In some cases, the example visualization components described in regard to FIGS. 5*a* and 5*b* can improve user comprehension of the resource, allocation of the resource, or potential reallocations of the resource. For example, a person who utilizes one or more of the example user interfaces described in regard to FIGS. 5*a* and 5*b* may have improved understanding of the resources that are available to the person. In addition, the person may use the example visualization components described in regard to FIGS. 5*a* and 5*b* to intuitively interact with the associated resource, such as by creating or modifying allocation plans that satisfy the person's goals without violating any constraints on the associated resource.

Each of FIGS. 5*a* and 5*b* (collectively referred to herein as FIG. 5) includes a diagram depicting an example of a user device 580. The user device 580 is configured to communicate with a visualization generation computing system, such as the visualization generation computing systems 110 or 210, as described elsewhere herein. In addition, the user device 580 provides a user interface 550, as depicted in FIG. 5*a*, or a modified user interface 550', as depicted in FIG. 5*b*. The user interface 550 and the modified user interface 550' present intuitive data visualizations, such as intuitive visualizations of resource allocation. In some cases, the user interfaces 550 and 550' present intuitive data visualizations based on one or more visualization data objects, such as a visualization data object 540. In addition, the visualization data object 540 describes resource data that is associated with the user device 580 (or a user account corresponding to the user device 580). In FIG. 5, the visualization data object 540 describes financial resource data that can be allocated by a user of the user device 580. For example, the user device 580 could receive the visualization data object 540 from a visualization generation computing system that is operated by (or on behalf of) a financial institution, a government agency, or another organization that stores financial resource data corresponding to the user of the user device 580.

In FIG. 5, the visualization data object 540 includes visualization data that indicates one or more visualization components, such as the visualization components 510*a*, 510*b*, 510*c*, 510*d*, and 510*e* (collectively referred to herein as visualization components 510). In addition, each of the visualization components 510 is a non-language visualization component that represents a portion of the resource data described by the visualization data object 540. For example, the visualization component 510*a* represents a first portion of the resource data that indicates a resource allocation goal, such as financial payment for a college degree. In addition, each of the visualization components 510*b*, 510*c*, and 510*d* respectively represents a second portion, a third portion, and a fourth portion of the resource data that indicates a respective financial outflow related to the first portion of the resource data, such as payments for tuition, textbooks, and student housing. In addition, the visualization component 510*e* represents a fifth portion of the resource data that indicates a financial inflow related to the first portion of the resource data, such as received scholarship funds.

In some implementations, the user device 580 provides the visualization components 510 via a visualization region 555 that is presented via the user interface 550. In the visualization region 555, the visualization components 510 are depicted (or otherwise presented) with characteristics (such as non-language characteristics) that describe the indicated portions of the resource data described by the visualization data object 540. For example, the visualization component 510*a* representing the first portion of the resource data are presented with one or more characteristics that intuitively indicate to the user of the user device 580 that the visualization component 510*a* represents the goal of a college degree. For the visualization component 510*a*, examples of such characteristics could include a size (e.g., indicating an overall cost), a shape (e.g., a relatively round shape to indicate a two-year degree, a relatively oblong shape to indicate a four-year degree), a placement within the region 555 (e.g., a left or right placement to indicate time), a sound (e.g., a college theme song, a cash register noise), a color (e.g., indicating a relative overall cost), or other characteristics that are presented via the visualization region 555. In addition, each of the visualization components 510*b*, 510*c*, 510*d*, and 510*e* respectively representing the second, third, fourth, and fifth portions of the resource data are presented with one or more characteristics that intuitively indicate the respective financial flows. For the visualization components 510*b*-510*e*, examples of such characteristics could include a direction with respect to the visualization component 510*a* (e.g., indicating an inflow or an outflow), a size (e.g., indicating a relative amount of the financial flow), a placement within the region 555 (e.g., a placement distance from the component 510*a* to indicate timing of the financial flow), a color (e.g., indicating an inflow or an outflow), or other characteristics that are presented via the visualization region 555.

In FIG. 5, the user of the user device 580 can adjust the presentation of one or more of the visualization components 510 within the visualization region 555. For example, the user device 580 may receive, via the user interface 550, one or more modification inputs that modify one or more characteristics of the visualization components 510. For example, the user could adjust a size of the visualization component 510*c*, indicating a change in the amount of tuition payments. Based on the one or more modification inputs, the user device 580 may modify the user interface 550, such as by providing the modified user interface 550' or a modified visualization region 555'. In addition, the user interface device may generate (or modify) modification input data 585 that describes the adjustments to the characteristics of the visualization components 510. For example, the modification input data 585 can indicate the adjustment to the visualization component 510*c*, such as data indicating a modified visualization component 510*c'*. In some cases, the user device 580 determines at least one modified relationship among the portions of resource data indicated by the visualization components 510. For example, the user device 580 could calculate that the adjusted size of the visualization component 510*c* indicates a changed tuition amount that exceeds the scholarship funds indicated by the visualization component 510*e*.

In some implementations, the user device 580 provides the modification input data 585 to at least one visualization generation computing system, such as the visualization generation computing system 110 or 210. In addition, the visualization generation computing system can determine at least one modified relationship among the portions of resource data indicated by the visualization components 510. In some cases, the user device 580 receives, from the visualization generation computing system, recommendation data 515 that indicates the at least one modified relationship. In addition, the recommendation data 515 could indicate one or more of an identified constraint relationship, a probability associated with an identified relationship, alert data (e.g., indicating a constraint that is violated or has a relatively high probability of being violated), or other data describing the relationships among the portions of resource data. For example, the recommendation data 515 could include visualization data indicating an adjustment to the visualization component 510*a*, such as data indicating a modified visualization component 510*a'* that has a modified size indicating an adjusted overall cost of the example college degree (e.g., based on the adjusted tuition cost indicated by the modified component 510*c'*). In addition, the recommendation data 515 could include visualization data indicating an adjustment to the visualization component 510*e*, such as data indicating a modified visualization component 510*e'* that has a modified size indicating an adjusted amount of received scholarship funds. In addition, the recommendation data 515 could include visualization data indicating an additional visualization component 510*f* that indicates an additional financial inflow, such as potential income from a student loan. The user device 580 can present, via the modified visualization region 555, the modified visualization components 510*a'*, 510*c'*, and 510*e'*, and the additional visualization component 510*f*.

In some cases, the recommendation data 515 can include data that indicates an allocation decision. For example, the recommendation data 515 could include alert data indicating that the modified visualization component 510*a'* violates a relationship constraint, such as an alert that the modified size exceeds an amount of the financial inflow indicated by the visualization component 510*e* (e.g., prior to modification). In addition, the recommendation data 515 could include decision data indicating that the user of the user device 580 can chose among allocation options to resolve the constraint, such as a decision between allocation options indicated by the modified visualization component 510*e'* (e.g., adjusting the scholarship funds) or the additional visualization component 510*f* (e.g., accepting a student loan). indicated by 510*c'*, In some cases, the user device 580 modifies the visualization region 555 to present one or more additional visualization components indicating the allocation decision, such as a non-language visualization component representing a decision point or additional non-language visualization components that represent respective outcomes (or potential outcomes) of the allocation options. In addition, the user device 580 could receive additional input data (e.g., via the user interface 550) indicating a selection of one of the allocation options. In some cases, the user device 580 could provide the decision input data to the visualization generation computing system. In some cases, one or more of the user device 580 or the visualization generation computing system could adjust allocation of the resource indicated by the visualization data object 540 based on the decision data. Continuing with the above example of a decision between allocation options of adjusting the scholarship funds or accepting a student loan, the user device 580 or the visualization generation computing system could perform operations related to implementing a selected decision, such as transferring scholarship funds or opening an application for a student loan for the user.

In some implementations, the user device 580 can configure the visualization region 555 (or 555') to present one or more sub-regions. In addition, the user device 580 could receive one or more modification inputs that adjust a particular one of the visualization component 510 (or 510') to present via the one or more sub-regions. For example, the user interface 550 could receive, from the user of the user device 580, a modification input that modifies a presentation region for the additional visualization component 510f, such as a modification input that drags (e.g., via a mouse or keyboard input) the additional visualization component 510f to a particular portion of the visualization region 555. In response to receiving the modification input that modifies the presentation region, the user device 580 could generate (or modify) one or more sub-regions of the visualization region 555. In addition, the user device 580 could present the additional visualization component 510f in one or more of the visualization region 555 or the sub-regions. In some cases, a sub-region could adjust a presentation of a particular visualization component, such as an adjusted presentation that provides an additional visualization (or other presentation type) of the portion of resource data represented by the particular visualization component. In some cases, the adjusted presentation can provide, such as to the user of the user device 580, information about one or more additional relationships involving the portion of resource data represented by the particular visualization component. For example, a particular sub-region of the visualization region 555 could indicate a time relationship of the portion of resource data. In the above example of the additional visualization component 510f, the time relationship sub-region could present additional information indicating a time relationship (e.g., interest) of the student loan represented by the additional visualization component 510f. In addition, a particular sub-region of the visualization region 555 could indicate a conversion relationship of the portion of resource data. Examples of conversion relationships could include conversion among currency types (e.g., conversion of scholarship funds received from an international source), conversion among digital currency types, conversion among multiple types of resources (e.g., determining a financial value of discounted housing, determining a time value of committing to a club sport), or other types of conversion among multiple types of resources. For example, in response to receiving an additional modification input that modifies the presentation region for the visualization component 510d, the conversion relationship sub-region could present additional information (e.g., an additional visualization component) indicating a financial conversion relationship of donated textbooks represented by the visualization component 510d.

Any suitable computing system or group of computing systems can be used for performing the operations described herein. For example, FIG. 6 is a block diagram depicting an example of a computing system 601 configured to provide a visualization generation computing system, according to certain embodiments.

The depicted example of the computing system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or other suitable processing device. The processor 602 can include any number of processing devices, including one.

The memory device 604 includes any suitable non-transitory computer-readable medium for storing the visualization generation module 120, the projection generation module 130, the visualization data object 140, the modification input data 185, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 601 may also include a number of external or internal devices such as input or output devices. For example, the computing system 601 is shown with an input/output ("I/O") interface 608 that can receive input from input devices or provide output to output devices. A bus 606 can also be included in the computing system 601. The bus 606 can communicatively couple one or more components of the computing system 601.

The computing system 601 executes program code that configures the processor 602 to perform one or more of the operations described above with respect to FIGS. 1-5. The program code includes operations related to, for example, one or more of the visualization generation module 120, the projection generation module 130, the visualization data object 140, the modification input data 185, or other suitable applications or memory structures that perform one or more operations described herein. The program code may be resident in the memory device 604 or any suitable computer-readable medium and may be executed by the processor 602 or any other suitable processor. In some embodiments, the program code described above, the visualization generation module 120, the projection generation module 130, the visualization data object 140, and the modification input data 185 are stored in the memory device 604, as depicted in FIG. 6. In additional or alternative embodiments, one or more of the visualization generation module 120, the projection generation module 130, the visualization data object 140, the modification input data 185, and the program code described above are stored in one or more memory devices accessible via a data network, such as a memory device accessible via a cloud service.

The computing system 601 depicted in FIG. 6 also includes at least one network interface 610. The network interface 610 includes any device or group of devices suitable for establishing a wired or wireless data connection to one or more data networks 612. Non-limiting examples of the network interface 610 include an Ethernet network adapter, a modem, and/or the like. A user device 680 is connected to the computing system 601 via network 612, and user device 680 can perform some of the operations described herein, such as generating modification input data or determining a relationship among portions of resource data. The computing system 601 is able to communicate with one or more of the user device 680 and the resource data repository 105 using the network interface 610.

Although FIG. 6 depicts the resource data repository 105 as connected to computing system 601 via the networks 612, other embodiments are possible, such as a resource data repository component (e.g., software, hardware, firmware, a combination thereof) that is included in one or more of the computing system 601 or the user device 680.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method including operations executed by one or more processors, the operations comprising:

receiving, from a visualization generation computing system, a visualization data object that indicates a relationship between a first portion of resource data associated with a first allocated portion of a financial resource and a second portion of resource data associated with a second allocated portion of the financial resource;

providing, via one or more output devices for a user interface, at least one visualization component described by the visualization data object;

receiving, via one or more input devices for the user interface, a modification input that describes a modified presentation of the at least one visualization component;

determining a modified relationship between the first allocated portion of the financial resource associated with the first portion of resource data and the second allocated portion of the financial resource associated with the second portion of resource data, wherein the modified relationship between the first allocated portion of the financial resource and the second allocated portion of the financial resource is determined based on the modified presentation of the at least one visualization component;

providing, to the visualization generation computing system, modification input data that indicates the modified relationship between the first allocated portion of the financial resource and the second allocated portion of the financial resource;

receiving, from the visualization generation computing system, a modified visualization data object including a modified visualization component that describes the modified relationship;

based on the modified visualization component, adjusting an allocation of the financial resource in which the first allocated portion of the financial resource and the second allocated portion of the financial resource are included, wherein adjusting the allocation includes one or more of transferring at least a portion of the financial resource or modifying a recurring resource event; and providing the modified visualization component via the one or more output devices for the user interface.

2. The method of claim 1, wherein the at least one visualization component is a non-language visualization component.

3. The method of claim 1, wherein the visualization data object includes visualization data that describes one or more characteristics of the at least one visualization component, wherein the visualization data describes one or more of: a shape, a color, a pattern, a direction, an orientation, a placement, a sound, or a haptic output.

4. The method of claim 1, the operations further comprising:

receiving, from the visualization generation computing system, reallocation data that describes a modification of the first portion of resource data or the second portion of resource data, wherein presenting the modified visualization component includes indicating the modification of the first portion of resource data or the second portion of resource data.

5. The method of claim 1, the operations further comprising:

receiving, from the visualization generation computing system, alert data that describes a relationship constraint between the first portion of resource data and the second portion of resource data, wherein presenting the modified visualization component includes indicating the relationship constraint between the first portion of resource data and the second portion of resource data.

6. The method of claim 1, the operations further comprising:

receiving, from the visualization generation computing system, probability data that describes a probability associated with the modified relationship between the first portion of resource data and the second portion of resource data, wherein presenting the modified visualization component includes indicating the probability associated with the modified relationship between the first portion of resource data and the second portion of resource data.

7. The method of claim 1, wherein providing the modified visualization component via the one or more output devices for the user interface further includes:

presenting the modified visualization component via one or more visualization regions provided by the one or more output devices, wherein each of the one or more visualization regions presents an additional visualization component that indicates an additional relationship involving the first portion of resource data or the second portion of resource data.

8. A visualization generation computing system comprising one or more processors configured to implement operations comprising:

determining a relationship between a first portion of resource data associated with a first allocated portion of a financial resource and a second portion of resource data associated with a second allocated portion of the financial resource;

generating a visualization data object that indicates the relationship between the first portion of resource data and the second portion of resource data, and receiving, from a user device, modification input data that describes an adjusted presentation of at least one visualization component described by the visualization data object;

determining a modified relationship between the first allocated portion of the financial resource associated with the first portion of resource data and the second allocated portion of the financial resource associated with the second portion of resource data, wherein the modified relationship between the first allocated portion of the financial resource and the second allocated portion of the financial resource is determined based on the adjusted presentation of the at least one visualization component;

modifying the visualization data object to include a modified visualization component that indicates the modified relationship between the first allocated portion of the financial resource associated with the first portion of resource data and the second allocated portion of the financial resource associated with the second portion of resource data;

based on the modified visualization component, adjusting an allocation of the financial resource in which the first allocated portion of the financial resource and the second allocated portion of the financial resource are included, wherein adjusting the allocation includes one or more of transferring at least a portion of the financial resource or modifying a recurring resource event; and providing the modified visualization data object to the user device, wherein the user device is configured to present the modified visualization component via one or more output devices of the user device.

9. The visualization generation computing system of claim 8, wherein the visualization data object includes visualization data that describes one or more characteristics of the at least one visualization component, wherein the visualization data describes one or more of: a shape, a color, a pattern, a direction, an orientation, a placement, a sound, or a haptic output.

10. The visualization generation computing system of claim 8, the operations further comprising:

generating reallocation data that describes a modification of the first portion of resource data or the second portion of resource data; and providing the reallocation data to the user device, wherein the user device is further configured to present an additional visualization component indicating the modification of the first portion of resource data or the second portion of resource data.

11. The visualization generation computing system of claim 8, the operations further comprising:

generating alert data that describes a relationship constraint between the first portion of resource data and the second portion of resource data; and providing the alert data to the user device, wherein the user device is further configured to present an additional visualization component indicating the relationship constraint between the first portion of resource data and the second portion of resource data.

12. The visualization generation computing system of claim 8, the operations further comprising:

generating probability data that describes a probability associated with the modified relationship between the first portion of resource data and the second portion of resource data; and providing the probability data to the user device, wherein the user device is further configured to present an additional visualization component indicating the probability associated with the modified relationship between the first portion of resource data and the second portion of resource data.

13. The visualization generation computing system of claim 8, the operations further comprising:

generating an additional visualization component that indicates an additional relationship involving the first portion of resource data or the second portion of resource data, wherein the user device is further configured to present the modified visualization component and the additional visualization component via respective visualization regions provided by the one or more output devices.

14. A non-transitory computer-readable medium embodying program code that, when executed by one or more processors, causes the processors to perform operations comprising:

receiving, from a visualization generation computing system, a visualization data object that indicates a relationship between a first portion of resource data associated with a first allocated portion of a financial resource and a second portion of resource data associated with a second allocated portion of the financial resource;

providing, via one or more output devices for a user interface, at least one visualization component described by the visualization data object;

receiving, via one or more input devices for the user interface, a modification input that describes a modified presentation of the at least one visualization component;

determining a modified relationship between the first allocated portion of the financial resource associated with the first portion of resource data and the second allocated portion of the financial resource associated with the second portion of resource data, wherein the modified relationship between the first allocated portion of the financial resource and the second allocated portion of the financial resource is determined based on the modified presentation of the at least one visualization component;

providing, to the visualization generation computing system, modification input data that indicates the modified relationship between the first allocated portion of the financial resource and the second allocated portion of the financial resource;

receiving, from the visualization generation computing system, a modified visualization data object including a modified visualization component that describes the modified relationship;

based on the modified visualization component, adjusting an allocation of the financial resource in which the first allocated portion of the financial resource and the second allocated portion of the financial resource are included, wherein adjusting the allocation includes one or more of transferring at least a portion of the financial resource or modifying a recurring resource event; and providing the modified visualization component via the one or more output devices for the user interface.

15. The non-transitory computer-readable medium of claim 14, wherein the at least one visualization component is a non-language visualization component.

16. The non-transitory computer-readable medium of claim 14, wherein the visualization data object includes visualization data that describes one or more characteristics of the at least one visualization component, wherein the visualization data describes one or more of: a shape, a color, a pattern, a direction, an orientation, a placement, a sound, or a haptic output.

17. The non-transitory computer-readable medium of claim 14, the operations further comprising:

receiving, from the visualization generation computing system, reallocation data that describes a modification of the first portion of resource data or the second portion of resource data, wherein presenting the modified visualization component includes indicating the modification of the first portion of resource data or the second portion of resource data.

18. The non-transitory computer-readable medium of claim 14, the operations further comprising:

receiving, from the visualization generation computing system, alert data that describes a relationship constraint between the first portion of resource data and the second portion of resource data, wherein presenting the modified visualization component includes indicating the relationship constraint between the first portion of resource data and the second portion of resource data.

19. The non-transitory computer-readable medium of claim 14, the operations further comprising:

receiving, from the visualization generation computing system, probability data that describes a probability associated with the modified relationship between the first portion of resource data and the second portion of resource data, wherein presenting the modified visualization component includes indicating the probability associated with the modified relationship between the first portion of resource data and the second portion of resource data.

20. The non-transitory computer-readable medium of claim 14, wherein providing the modified visualization component via the one or more output devices for the user interface further includes:

presenting the modified visualization component via one or more visualization regions provided by the one or more output devices, wherein each of the one or more visualization regions presents an additional visualization component that indicates an additional relationship involving the first portion of resource data or the second portion of resource data.

* * * * *